(12) United States Patent
McClean (10) Patent No.: US 10,227,245 B2
(45) Date of Patent: Mar. 12, 2019

(54) ADVANCED OXIDATION SYSTEM AND METHOD IN A UV REACTOR WITH ELECTRODE

(71) Applicant: Neptune-Benson, LLC, Coventry, RI (US)

(72) Inventor: Jonathan Charles McClean, Beaver Dam, WI (US)

(73) Assignee: Neptune Benson Inc., Coventry, RI (US)

( * ) Notice: Subject to any disclaimer, the term of this patent is extended or adjusted under 35 U.S.C. 154(b) by 0 days.

(21) Appl. No.: 15/423,071

(22) Filed: Feb. 2, 2017

(65) Prior Publication Data

US 2017/0144901 A1    May 25, 2017

Related U.S. Application Data

(62) Division of application No. 14/229,775, filed on Mar. 28, 2014, now Pat. No. 9,630,863.

(51) Int. Cl.

| C02F 1/32 | (2006.01) |
|---|---|
| C02F 1/72 | (2006.01) |
| C25B 11/03 | (2006.01) |
| C25B 11/04 | (2006.01) |
| C25B 1/30 | (2006.01) |
| C02F 1/467 | (2006.01) |
| C25B 11/02 | (2006.01) |
| C25B 15/08 | (2006.01) |
| C25B 1/04 | (2006.01) |
| C02F 1/461 | (2006.01) |
| C02F 103/42 | (2006.01) |

(52) U.S. Cl.
CPC .......... *C02F 1/72* (2013.01); *C02F 1/32* (2013.01); *C02F 1/4672* (2013.01); *C02F 1/46109* (2013.01); *C25B 1/04* (2013.01); *C25B 1/30* (2013.01); *C25B 11/02* (2013.01); *C25B 11/035* (2013.01); *C25B 11/0405* (2013.01); *C25B 15/08* (2013.01); *C02F 2001/46138* (2013.01); *C02F 2001/46152* (2013.01); *C02F 2001/46157* (2013.01); *C02F 2103/42* (2013.01); *C02F 2201/46105* (2013.01); *C02F 2305/023* (2013.01); *Y02E 60/366* (2013.01)

(58) Field of Classification Search
CPC ............ C02F 1/72; C02F 2201/46105; C25B 11/035; C25B 11/0405; C25B 1/30
See application file for complete search history.

(56) References Cited

U.S. PATENT DOCUMENTS

| 4,830,721 | A | 5/1989 | Bianchi et al. |
|---|---|---|---|
| 5,720,869 | A * | 2/1998 | Yamanaka ............... C02F 1/32 204/263 |
| 6,420,715 | B1 | 7/2002 | Cormack |
| 7,097,764 | B2 | 8/2006 | Neofotistos |
| 7,507,973 | B2 | 3/2009 | Bircher |
| 8,459,861 | B2 | 6/2013 | Bircher |
| 2010/0118301 | A1 | 5/2010 | Vondras |
| 2011/0010835 | A1* | 1/2011 | McCague ............. C02F 1/4674 4/494 |

(Continued)

*Primary Examiner* — Walter D. Griffin
*Assistant Examiner* — Cameron J Allen (57) ABSTRACT

A system and method for applying an advanced oxidation process to a UV fluid reactor. An L-shaped electrode is connected to a UV reactor hatch and inserted into the reactor upstream from a UV radiation source.

10 Claims, 6 Drawing Sheets

(56) References Cited

U.S. PATENT DOCUMENTS

| 2012/0048744 | A1  | 3/2012 | Kim |
| 2013/0220829 | A1* | 8/2013 | Rigby ................ C02F 1/46104 |
| | | | 205/744 |
| 2014/0263092 | A1* | 9/2014 | Sanchez Cano ........ C02F 1/325 |
| | | | 210/748.12 |

* cited by examiner

ADVANCED OXIDATION SYSTEM AND METHOD IN A UV REACTOR WITH ELECTRODE

CROSS-REFERENCE TO RELATED APPLICATION

This application is a divisional application of and claims the benefit under 35 U.S.C. § 120 to U.S. patent application Ser. No. 14/229,775, titled ADVANCED OXIDATION SYSTEM AND METHOD IN A UV REACTOR WITH ELECTRODE, which was filed on Mar. 28, 2014, issued as U.S. Pat. No. 9,630,863, which is incorporated herein in its entirety for all purposes.

BACKGROUND

The present invention relates generally to UV fluid treatment systems and specifically to such systems and methods that incorporate electrodes to facilitate advanced oxidation processes (AOP). Such electrodes include those that are based on electrolytic production of hydrogen peroxide, or are optimized for the production of hydrogen peroxide and/or for the destruction of organic contaminants in industrial wastewater, including mixed metal oxide electrodes having two kinds of metal oxides, such as those disclosed in U.S. Pat. No. 8,580,091 (issued Nov. 12, 2013), included herein by reference as if fully re-written herein.

AOP that generally use UV plus peroxide can be used for many water and wastewater (i.e. fluid) based oxidation processes. Conventional peroxide systems are chemical based and generally require the dangerous chemical to be tankered in and stored. The present invention offers many advantages over what is done now.

In one embodiment, the present invention incorporates an L-shaped electrode, placed upstream from the UV lamps, that forms hydroxyl radicals. The electrode is inserted into the UV reactor through the existing access hatch.

In one embodiment, elongated, tubular UV lamps are used as the UV radiation source. Such lamps produce the least UV at their ends. In other words, the radiation intensity is diminished resulting in a lower UV dosage delivered near the lamp ends.

Additionally, elongated medium pressure (MP) lamps blacken over time and the arc shortens. These characteristics result in diminished UV dosages in UV reactors having such lamps oriented transversely to the fluid flow. Accordingly, it would be advantageous to direct the flow of fluid away from the ends and towards the center of such elongated lamps. It is also advantageous to move the fluid away from the top and bottom of the chamber (i.e. vertically). The present invention overcomes these, as well as other disadvantageous that will be apparent to those of skill in the art, by tapering the electrode veins so as to direct the flow of fluid towards the center of the elongated lamps—the area of highest UV fluence.

In one embodiment, the electrodes are titanium mesh, coated with Iridium and/or Ruthenium. In one embodiment, the electrodes are made from a mesh-like structure which increases surface area and disrupts the fluid flow pattern more than a solid sheet would; which is advantageous. In one embodiment, the present invention incorporates an electrode inserted into an access hatch of a UV reactor, immediately upstream of the UV radiation source.

By applying a voltage to the electrode the water is hydrolyzed and hydroxyl radicals are formed immediately before the UV system lamps (aka UV radiation source). When the hydroxyl radicals interact with the UV lamps an advanced oxidation process occurs. This process can be used to oxidize many contaminants out of many different types of water, swimming pool, or other recreational water and waste water; including water for reuse, as well as ultra-pure water.

When such a system is operated with the electrode in front (i.e. upstream) of the UV system, it acts as an advanced oxidation process. When the system is operated with the electrode behind (i.e. downstream) the UV lamp, and salt is introduced into the water upstream of the UV lamps, the system will provide a self-contained UV system plus residual chlorine provider.

One advantage of the L-shaped electrode of the present invention is to maximize surface area. The electrode is powered by DC voltage, and it has variable output base on the amperage and DC voltage that is fed to it. The DC voltage can switch, so as to assist in the removal of any scale of hardness from the electrode surface. In one embodiment, the voltage polarity (relative to the cathode and anode) is switched so as to assist in the removal of any scale of hardness from the electrode surface.

$$H_2O_2 + h\nu \rightarrow 2.OH \Phi = 1.0$$

A reduction reaction takes place at the negatively charged cathode with electrons (e−) from the cathode being given to hydrogen cations to form hydrogen gas (the half reaction balanced with acid):

Reduction at Cathode:

$$2H^+(aq) + 2e^- \rightarrow H^2(g)$$

An oxidation reaction occurs at the positively charged anode, generating oxygen gas and giving electrons to the anode to complete the circuit:

Anode (Oxidation):

$$2H_2O(l) \rightarrow O_2(g) + 4H^+(aq) + 4e^-$$

The same half reactions can also be balanced with base as listed below. Not all half reactions must be balanced with acid or base. Many do, like the oxidation or reduction of water listed here.

Cathode (Reduction):

$$2H_2O(l) + 2e^- \rightarrow H_2(g) + 2OH^-(aq)$$

Anode (Oxidation):

$$4OH^-(aq) \rightarrow O_2(g) + 2H_2O(l) + 4e^-$$

Combining either half reaction pair yields the same overall decomposition of water into oxygen and hydrogen:

Overall Reaction:

$$2H_2O(l) \rightarrow 2H_2(g) + O_2(g)$$

The number of hydrogen molecules produced is thus twice the number of oxygen molecules. Assuming equal temperature and pressure for both gases, the produced hydrogen gas has therefore twice the volume of the produced oxygen gas. The number of electrons pushed through the water is twice the number of generated hydrogen molecules and four times the number of generated oxygen molecules. Some of the other advantages of the present invention include:

Production of active substances, immediately adjacent to the UV lamp(s) with no harmful disinfection by products;

Elimination of transport, storage, handling of Hydrogen Peroxide inherent with conventional systems;

Scalable, no moving parts; and

The L-shaped electrode improves water flow patterns, which therefore improve the performance of the UV system.

Initiation:

$$H_2O_2/HO_2^- = h\nu \rightarrow 2HO\cdot$$

Propagation:

$$H_2O_2/HO_2^- + HO\cdot \rightarrow H_2O/OH^- + HO_2\cdot$$

$$H_2O_2 + HO_2\cdot/O_2\cdot^- \rightarrow HO\cdot + H_2O/OH^- + O_2$$

Termination:

$$HO\cdot + HO\cdot \rightarrow H_2O_2$$

$$HO\cdot + HO_2\cdot^{500}/O_2\cdot^- \rightarrow H_2O/OH^- + O_2$$

$$HO_2\cdot + HO_2\cdot^{500}/O_2\cdot^- \rightarrow H_2O_2/HO_2^- + O_2$$

REFERENCE NUMERALS IN DRAWINGS

The table below lists the reference numerals employed in the figures, and identifies the element designated by each numeral.

1 UV reactor 1
2 reactor access hatch 2
3 UV radiation source 3
4 directional fluid flow arrows 4
5 electrode 5
6 cathode 6
7 anode 7
8 upper vertical portion 8 of cathode 6
9 lower horizontal portion 9 of cathode 6
10 upper vertical portion 10 of anode 7
11 lower horizontal portion 11 of anode 7
12 tab 12 of upper, vertical portion 8 of cathode 6
13 tab 13 of upper, vertical portion 10 of anode 7
14 hole 14 in upper, vertical portion 8 of cathode 6
15 hole 15 in upper, vertical portion 10 of anode 7
16 holes 16 in lower, horizontal portion 9 of cathode 6
17 holes 17 in lower, horizontal portion 11 of anode 7
18 threaded titanium rod with nut 18
19 titanium spacer 19
20 threaded non-conducting rod with nut 20 (e.g. PVC)
21 non-conducting spacer 21
22 first connection terminal 22
23 second connection terminal 23
24 hydrogen exhaust port 24

DETAILED DESCRIPTION

In one embodiment, in a UV (i.e. ultra violet) fluid reactor 1, an electrode 5 comprises, a plurality of L-shaped, substantially planar cathodes 6; and a plurality of L-shaped, substantially planar anodes 7.

In one embodiment, the UV radiation source comprises a plurality of tubular, medium pressure, mercury vapor lamps, enclosed by a quartz sleeve. Those of skill in the art will appreciate that other UV radiation sources can be used (e.g. amalgam lamps) without compromising the spirit of the invention.

The plurality of L-shaped, substantially planar cathodes 6 are electrically connected to each other and are at substantially a first voltage. The plurality of L-shaped, substantially planar anodes 7 are electrically connected to each other and are at substantially a second voltage. In one embodiment, the first and second voltages differ by approximately 36 volts (e.g. the first voltage is zero and the second voltage is 36 volts). In one embodiment, the range of DC voltage is 0-36 volts, and 0-12 amps.

The voltage polarity can be switched, depending on how fouled the electrodes become. Reversing the polarities in such a manner achieves the advantage of mitigating scaling and/or the accumulation of other undesirable particles and/or substances. The interval of such reversal is calibrated according to the application. For example, in one embodiment, a timer is used and the interval (i.e. duty cycle) varies from once per day (worst case-heavy fouling/scaling) to once per month (soft water).

Each cathode 6 is electrically connected (and likewise for each anode 7) to each other. In one embodiment, the connectivity is achieved by inserting threaded titanium rod 18 (i.e. threaded conducting rod) through hole 14 of each upper, vertical portion 8 of each cathode 6, using titanium (i.e. conducting) spacers 19 as necessary to achieve the desired distance between each cathode. The connectivity of each anode 7 is achieved by inserting threaded titanium rod 18 (i.e. threaded conducting rod) through hole 15 of each upper, vertical portion 10 of each anode 7, using titanium spacers 19 as necessary to achieve the desired distance between each anode.

Figure 1:
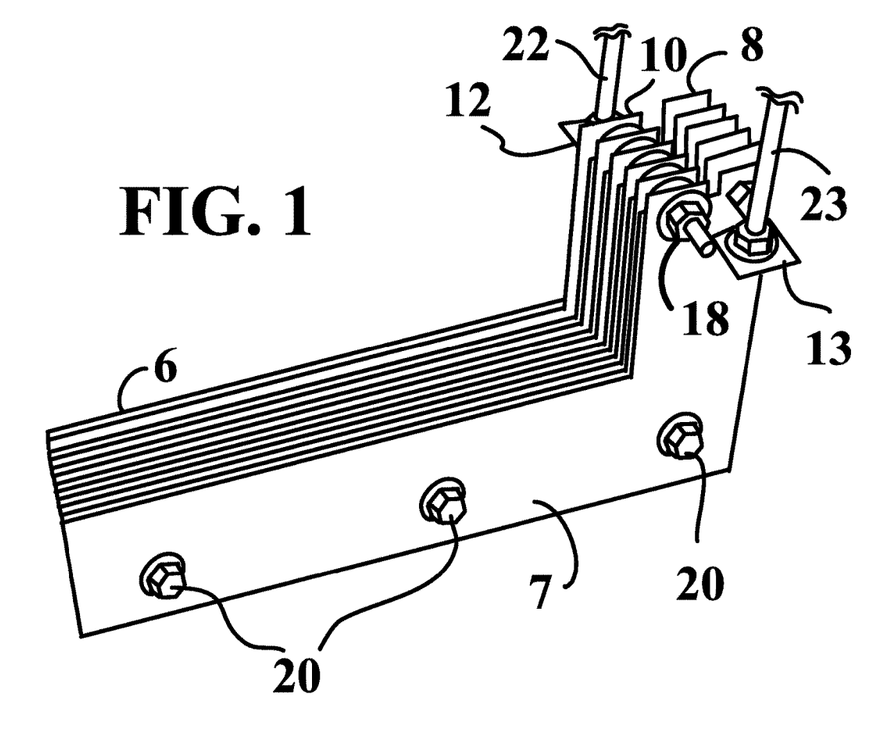
FIG. 1 depicts a perspective upper view of one embodiment of the electrode of the present invention.
Figure 2:
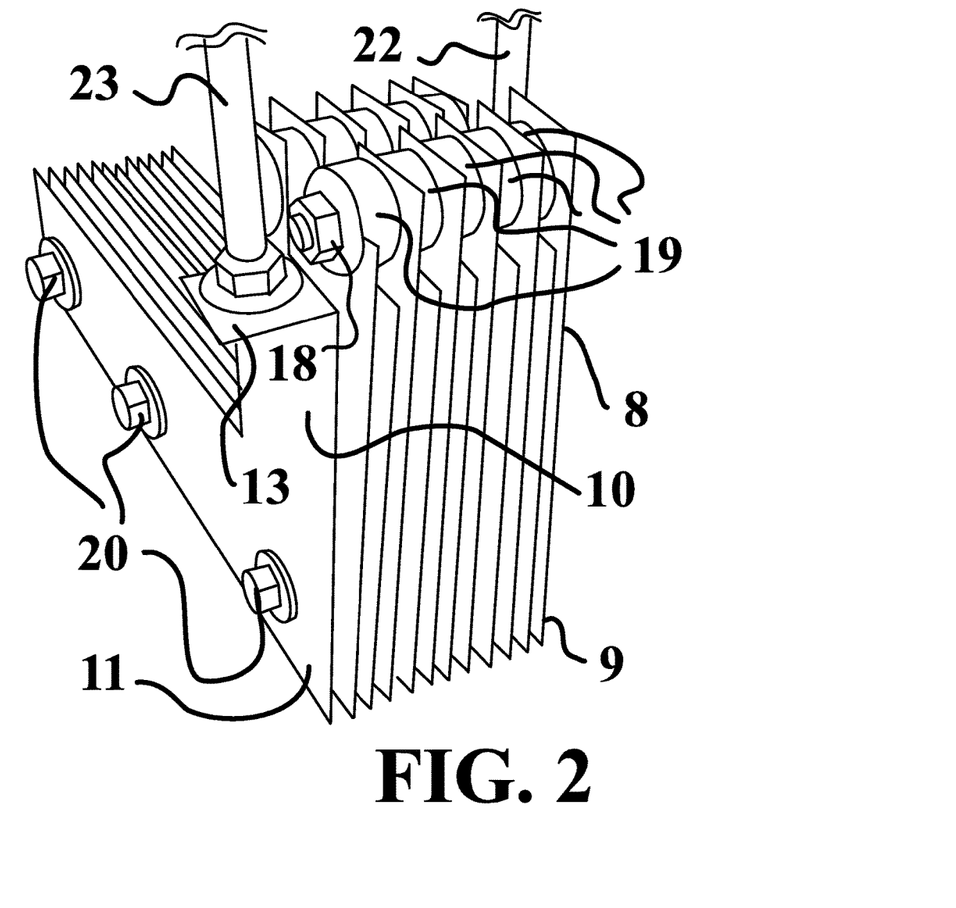
FIG. 2 depicts a perspective rear view of one embodiment of the electrode of the present invention.

The electrically connected cathodes 6 are non-electrically connected to the electrically connected anodes 7 by first arranging the cathodes and anodes, relative to each other, so that there is one anode between every two cathodes and vice versa (except on the ends); and so that holes 16 and 17 are coaxially aligned. In other words, the cathodes and anodes are alternatingly, cooperatively arranged. This arrangement is depicted in FIGS. 1 and 2.

To achieve the non-electrical connection of cathodes 6 to anodes 7, non-conducting (e.g. PVC) threaded rods 20 are inserted through each of holes 16 in each lower, horizontal portion 9 of each cathode 6 as well as through each of holes 17 in each lower, horizontal portion 11 of each anode 7; using non-conducting spacers 21 as necessary to achieve the desired distance between each respective cathode and anode.

It is to be understood that the number of cathode/anode pairs can be varied to achieve differing levels of reaction. For example, FIGS. 1, 2, 4B and 4C depict six pairs.

In one embodiment, the various cathodes 6 and anodes 7 are made from a mesh material. However, a solid material can be substituted. In another embodiment, each cathode and anode are made from a titanium mesh material that is coated with iridium and/or ruthenium. In one embodiment, mixed metal oxide, iridium and ruthenium oxide coated titanium substrates (e.g. grade 1 or 2, 0.063 inches thick) are used. It is to be understood that while titanium is used in some embodiments for the various electrodes, threaded rods, bolts, and spacers, other conducting metals may be used.

Figure 3:
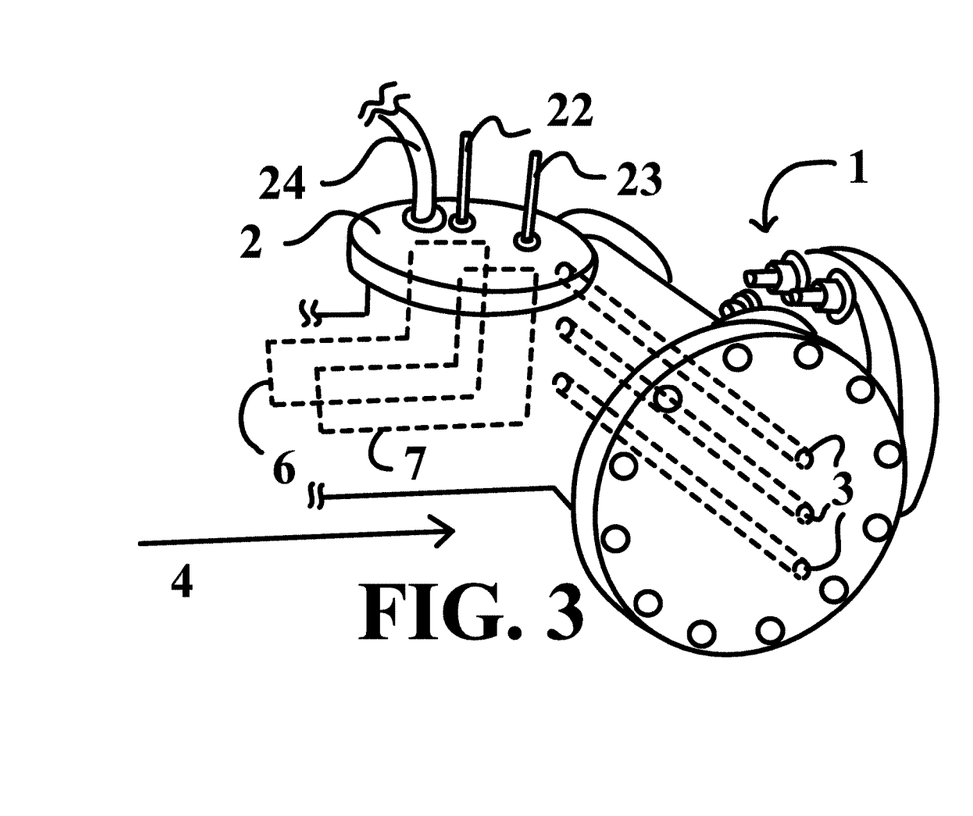
FIG. 3 depicts a perspective view of the UV reactor in accordance with one embodiment of the invention.
Figure 4A:
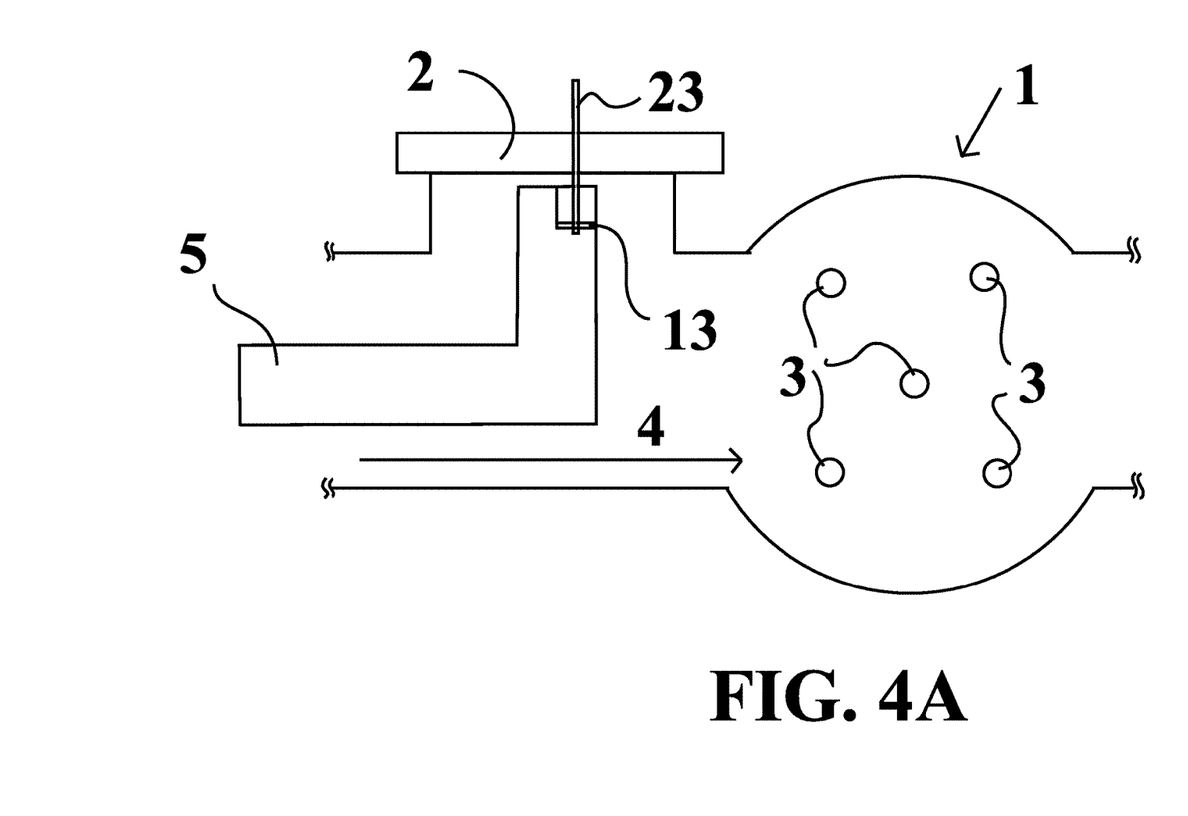
FIG. 4A depicts a partial, cross sectional side view of one embodiment of the present invention.

As shown in FIGS. 1 and 2, first connection terminal 22 is electrically connected to tab 12 of upper, vertical portion 8 of cathode 6. Likewise, second connection terminal 23 is electrically connected to tab 13 of upper, vertical portion 10 of anode 7. Electrode 5 is then inserted into access hatch 2 of reactor 1 as shown in FIGS. 3 and 4A.

Figure 4B:
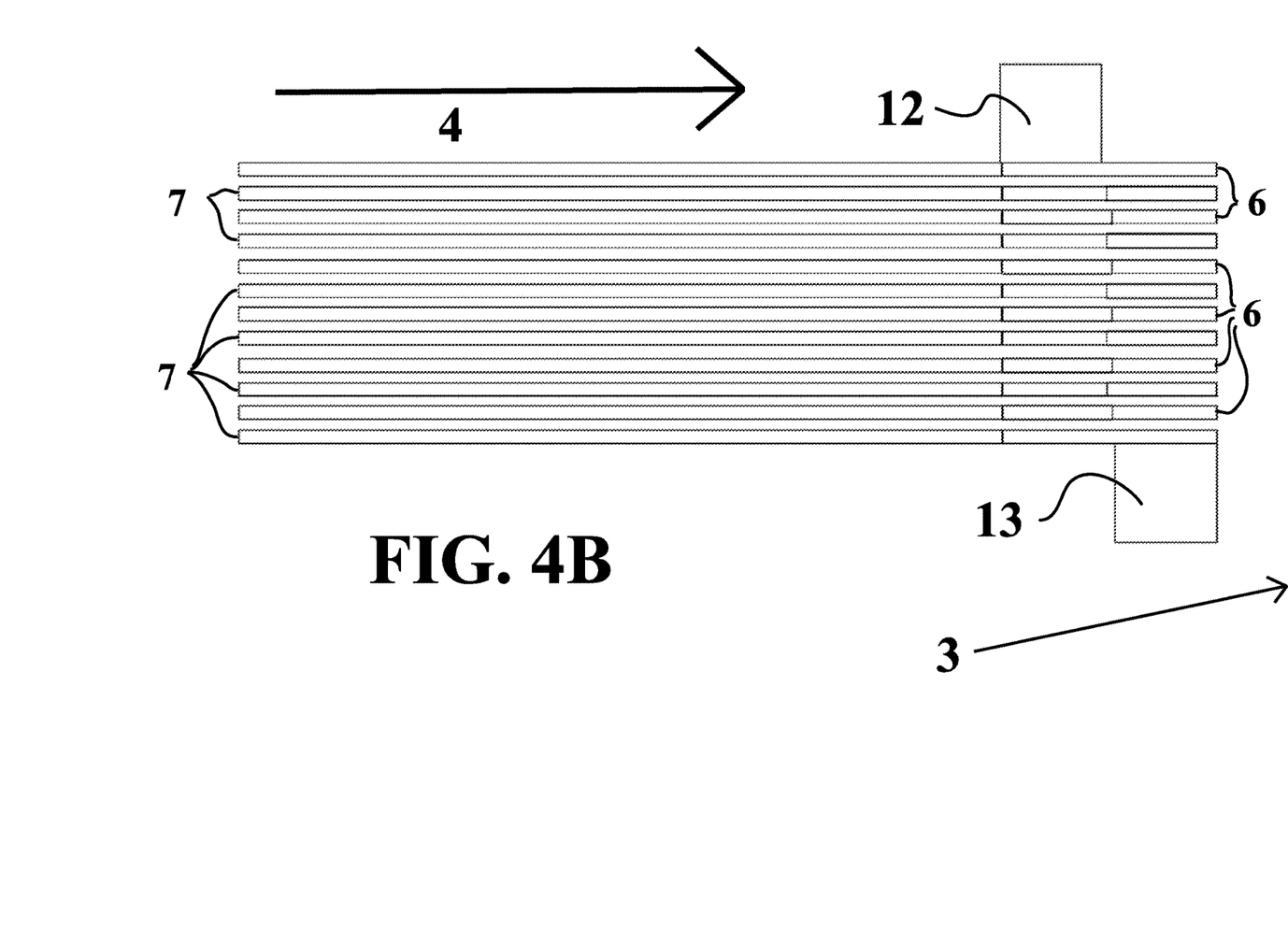
FIG. 4B depicts a top view of one embodiment of the present invention wherein the veins are parallel.
Figure 4C:
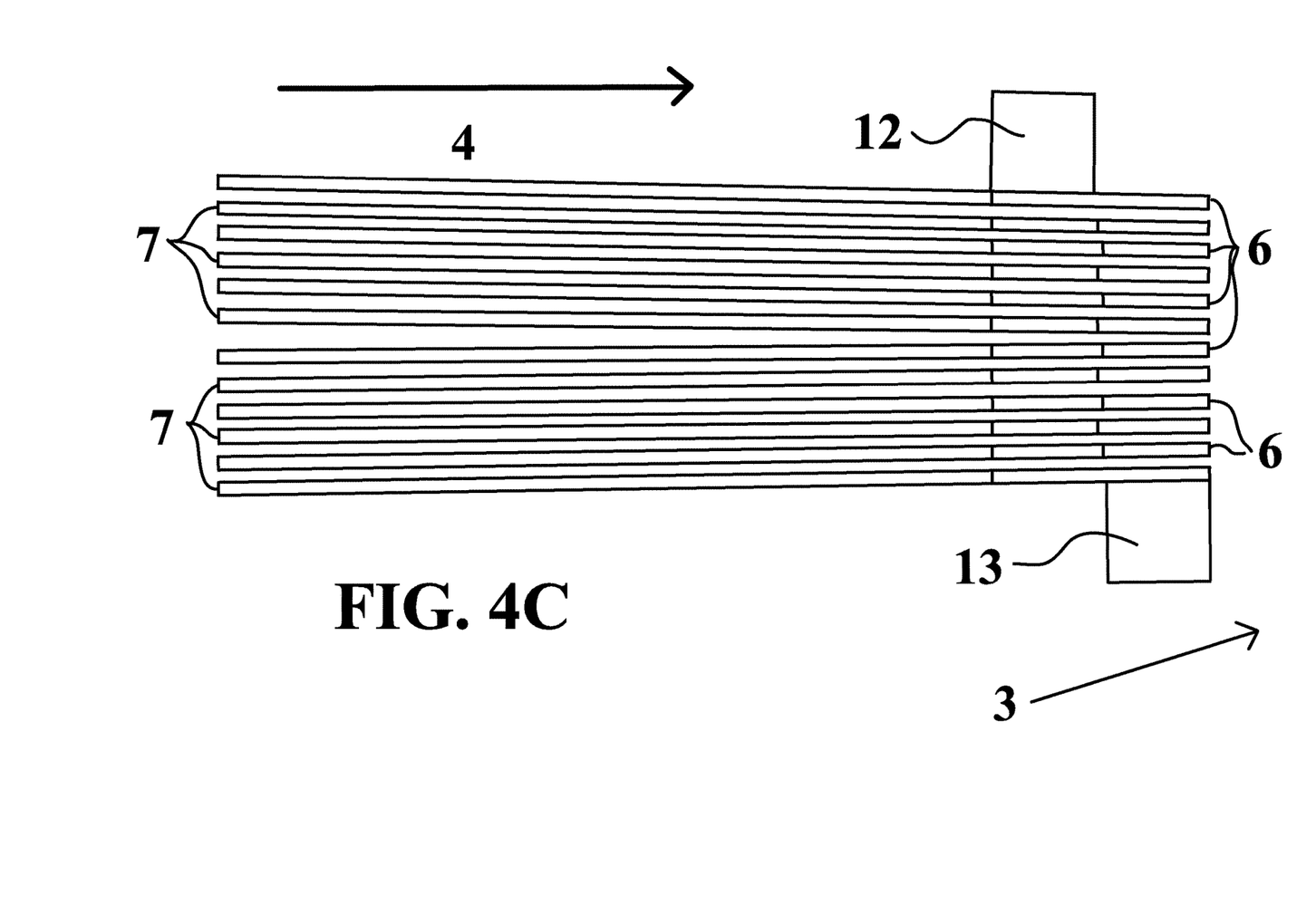
FIG. 4C depicts a top view of an alternative embodiment of the present invention wherein the veins are tapered.

In one embodiment, each cathode 6 and each anode 7 are substantially parallel to each other (FIG. 4B). In another embodiment (FIG. 4C), the cathodes and anodes are longitudinally tapered to affect the fluid flow towards the lateral center of the reactor. This arrangement necessarily implies the electrode must be upstream from the radiation source in this particular embodiment. The longitudinal tapering is more fully appreciated from the plan view as depicted in FIG. 4C. UV radiation source 3 is elongated and oriented transverse to fluid flow (e.g. FIG. 3); the electrodes act as veins to direct the fluid flow towards the arc (i.e. the center of an elongated UV lamp) and away from the ends of the lamp. The veins are tapered, relative to the horizontal plane, so as to move the fluid towards the center of the arc. A distinct advantage is achieved by moving the fluid (e.g. water) away from the ends of the lamp.

Those of skill in the art will appreciate that such an arrangement will direct the flow of fluid away from the ends of an elongated radiation source (e.g. a tubular medium pressure mercury vapor lamp) arranged perpendicularly (i.e. transverse) to fluid flow, towards the center of the radiation source. A distinct advantage is thereby achieved because the radiation intensity of such a radiation source is diminished somewhat towards the ends thereof.

In one embodiment, the veins (i.e. cathodes and anodes) are parallel (e.g. FIG. 4B), and the distance between each vane is in the range of from about 0.2 to 0.4 inches. In another embodiment, the veins are tapered (e.g. FIG. 4C) and the distance between veins (downstream end) is in the range of from about 0.1 to 0.2 inches; and the distance between veins (upstream end) is in the range of from about 0.2 to 0.5 inches. Those of skill in the art will appreciate that the degree of tapering can be adjusted to accommodate differing reactor and/or lamp geometries.

In one embodiment (e.g. FIG. 3), access hatch 2 has hydrogen exhaust port 24. It is to be noted that port 24 does not have to be placed in hatch 2. Alternatively, the exhaust port can be placed in the reactor itself.

Those of skill in the art will appreciate that the size of electrode 5 is proportional to the size of reactor 1. Thus, various sizes are possible in accordance with conventional reactors.

What is claimed is:

1. An advanced oxidation method comprising the steps of:
   providing in an alternating arrangement, a plurality of planar cathodes and a plurality of planar anodes; and
   placing the alternating arrangement of plurality of cathodes and plurality of anodes upstream from a UV radiation source; and
   in water, energizing the plurality of planar cathodes and plurality of planar anodes and energizing the UV radiation source to effect advanced oxidation,
   wherein the UV radiation source being elongated and tubular, the alternating arrangement of plurality of cathodes and plurality of anodes arranged into a plurality of veins, each longitudinally tapered so as to direct a flow of fluid therethrough laterally towards the center of the UV radiation source.

2. The method of claim 1, further comprising providing an access hatch having a hydrogen exhaust port.

3. A method of facilitating advanced oxidation, comprising:
   providing in a UV fluid reactor, an electrode structure in water, comprising
      a plurality of substantially planar cathodes, the plurality of substantially planar cathodes being electrically connected to each other,
      a plurality of substantially planar anodes, the plurality of substantially planar anodes being electrically connected to each other,
      conductive spacers disposed between adjacent respective anodes and cathodes, and
      non-conductive spacers disposed between adjacent anodes and cathodes;
   wherein the plurality of substantially planar cathodes and plurality of substantially planar anodes are alternatingly, cooperatively arranged, and respectively connectable to a voltage source connected across the respective anodes and cathodes.

4. The method of claim 3 wherein the cathodes and anodes are disposed substantially in parallel to each other.

5. The method of claim 3, wherein the UV fluid reactor has a UV radiation source that is tubular, and oriented transverse to a fluid flow through the UV fluid reactor and placed and downstream from the cathodes and anodes.

6. The method of claim 5, wherein each cathode and anode is longitudinally tapered so as to direct the flow of fluid towards a lateral center of the elongated and tubular UV radiation source.

7. The method of claim 6 wherein each cathode and anode tapers from a wider end to a narrower end in the direction of the elongated and tubular radiation source.

8. The method of claim 3 wherein each cathode and anode is constructed from a mesh material.

9. The method of claim 8 wherein each cathode and anode is constructed from a titanium mesh material.

10. The method of claim 9 wherein the titanium mesh is coated with iridium and/or ruthenium.

* * * * *